US012569077B1

(12) United States Patent
Rogers

(10) Patent No.: US 12,569,077 B1
(45) Date of Patent: Mar. 10, 2026

(54) SYSTEM AND METHOD FOR POSITIONING OF AN INFANT USING MAGNETS

(71) Applicant: THE PLAGIOCEPHALY SOLUTION, LLC, Reston, VA (US)

(72) Inventor: Gary Rogers, Reston, VA (US)

(73) Assignee: THE PLAGIOCEPHALY SOLUTION, LLC, Reston, VA (US)

( * ) Notice: Subject to any disclaimer, the term of this patent is extended or adjusted under 35 U.S.C. 154(b) by 0 days.

(21) Appl. No.: 18/882,441

(22) Filed: Sep. 11, 2024

(51) Int. Cl.

| | |
|---|---|
| ***A47D 15/00*** | (2006.01) |
| ***A41D 11/00*** | (2006.01) |
| ***G08B 21/02*** | (2006.01) |

(52) U.S. Cl.
CPC ............ *A47D 15/008* (2013.01); *A41D 11/00* (2013.01); *G08B 21/0288* (2013.01)

(58) Field of Classification Search
None
See application file for complete search history.

(56) References Cited

U.S. PATENT DOCUMENTS

| | | | | |
|---|---|---|---|---|
| 5,825,293 | A | 10/1998 | Ahmed et al. | |
| 5,914,660 | A | 6/1999 | Mesibov | |
| 8,572,782 | B1 * | 11/2013 | Amini | A47D 15/001 5/660 |
| 2002/0007124 | A1 | 1/2002 | Woodward | |
| 2008/0094226 | A1 | 4/2008 | O'Shea et al. | |
| 2008/0106421 | A1 | 5/2008 | Adams et al. | |
| 2011/0295083 | A1 | 12/2011 | Doelling et al. | |
| 2025/0057258 | A1 * | 2/2025 | Marshall | A41B 13/06 |

OTHER PUBLICATIONS

Search Report and Written Opinion dated Oct. 29, 2025 issued in corresponding PCT/US2025/045881.

* cited by examiner

*Primary Examiner* — Adam C Ortiz
(74) *Attorney, Agent, or Firm* — Oblon, McClelland, Maier & Neustadt, L.L.P.

(57) ABSTRACT

A magnetic positioning apparatus for an item of clothing, the apparatus including an item of clothing having a front side and a back side; and at least one first magnet secured to the item of clothing, wherein the at least one first magnet is secured to the back side of the item of clothing.

16 Claims, 12 Drawing Sheets

SYSTEM AND METHOD FOR POSITIONING OF AN INFANT USING MAGNETS

BACKGROUND

Field of the Disclosure

This disclosure relates to an infant sleeping garment that includes magnets that secure an infant to a sleeping surface, specifically on their backs, to help reduce the incidence of sudden infant death syndrome (SIDS).

Description of the Related Art

Magnets, as applied in the world of infants, have been used as an alternate closure mechanism on infant clothes as described in U.S. Pat. No. 9,572,386, for example. The magnets may be used as a convenient and faster way to secure clothes on infants and small children than traditional closure mechanisms.

It is also known in the art that one of the main ways to help reduce the incidence of SIDS is to have a safe and controlled sleeping environment, including supine positioning of very young infants. Supine positioning during sleep is widely advocated by pediatricians as one of the most impactful ways to reduce the incidence of SIDS. There are many products on the market designed to maintain a supine infant sleep position, including pillows, wedges and restraints, but these are considered unsafe by most authorities and regulatory bodies. There are also monitors that can be placed directly on the infant to assess breathing and movement as they sleep. Additionally, there are products which utilize a strap attached to the crib mattress and a special swaddle made to specifically attach to the strap and confine the infant in place.

There are other methods used for securing babies as they sleep as described in U.S. Pat. No. 11,490,663, for example. This patent utilizes a specialized infant swaddle which encloses the infant's arms and legs and then a separate support element which may be coupled to the swaddle and also to a sleep surface. The support element may include flaps extending away from the swaddle worn by the infant which can be secured to a sleep surface using various attachment mechanisms, one of which may include magnets in the flaps.

One of the main drawbacks of the systems discussed above is that they unduly restrict an infant's movement of their extremities (i.e., head, arms, and legs) while they are sleeping. By not allowing the infant to move their head, positional head flattening known as plagiocephaly and/or brachycephaly can result from the infant lying on a flat surface continuously in one position for too long of a period of time, such as during sleep. Additionally, restricting the infant's movement of their extremities can slow or hinder development of motor skills.

SUMMARY

The foregoing paragraphs have been provided by way of general introduction and are not intended to limit the scope of the following claims. The described embodiments, together with further advantages, will be best understood by reference to the following detailed description taken in conjunction with the accompanying drawings.

In one or more embodiments of the invention, a system is provided which includes an infant sleep garment and a sleeping surface. The sleeping garment includes at least one magnet. The at least one magnet is secured by magnetic attraction to a corresponding at least one magnet provided with a sleeping surface for the infant. When the infant wears the sleeping garment and is placed on the sleeping surface, the engagement between the corresponding magnets holds the infant in a desired sleeping position, which is in a supine position with the infant's face pointing upwards.

In one or more embodiments, the at least one magnet provided with the sleeping garment is secured to a back side of the sleeping garment. In this way, the infant is maintained in a position of sleeping on its back as the magnetic attraction between the at least one magnet in the garment and the corresponding at least one magnet with the sleeping surface prevent the infant from rolling over to an undesirable position, such as on its stomach.

In a further embodiment, an alarm feature is included, which provides parents or caregivers with an alert that the infant has moved from the desired sleeping position, i.e., has changed from a position sleeping on its back or otherwise moved away from the magnet attachment area. The alarm feature allows adults to monitor the movement of the infant during sleep and send an alert so that the infant could be repositioned to a supine position to help reduce the risk of SIDS.

The magnetic system of one or more embodiments of the invention provides for a novel system and method for creating a safe and controlled sleeping environment for the infant, which help reduce the incidence of SIDS.

Further, because the sleeping garment may otherwise resemble a standard infant sleeping garment which allows the infant to move its extremities, the addition of the magnetic system still allows the infant to move all their extremities (i.e., head, arms, and legs) and wiggle. This freedom of movement helps to minimize positional flattening of the infant's head by plagiocephaly and/or brachycephaly, which is usually a result of lying flat too long during the beginning stages of life.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Figure 1:
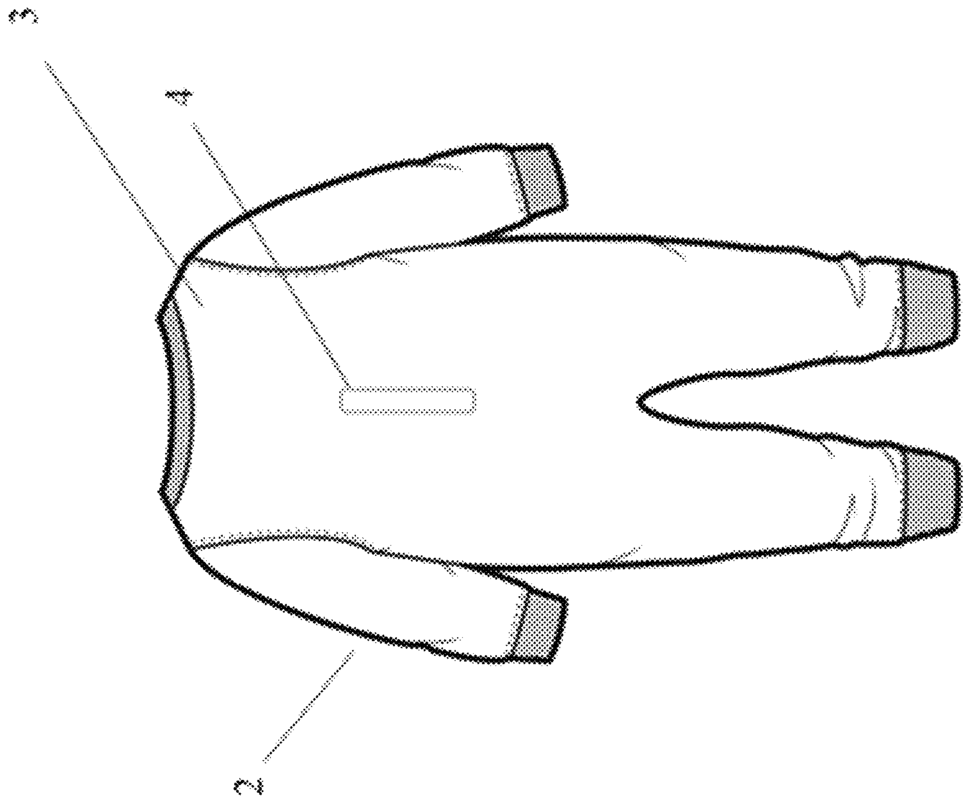
FIG. 1 is a view of a back of a sleeping garment, according to one embodiment of the disclosure.

FIG. 1 shows a back view of an infant garment 2 according to one or more embodiments of the invention. As shown in FIG. 1, at least one magnet 4 is secured to a back region 3 of the infant garment. In one embodiment, the at least one magnet 4 is oriented along a length direction extending from an area of the top end of the garment 2 disposed proximal to where the infant's head can be disposed to an area of a bottom end of the garment 2 proximal to where the infant's lower body can be disposed. In one embodiment, the at least one magnet 4 extends along a width direction substantially orthogonal to the length direction. In one embodiment, the at least one magnet 4 extends along a cross-body direction that is an angle in between the length direction and the width direction.

In one embodiment, the infant garment 2 can be any type of infant garment, for example a long sleeve or short sleeve sleep garment, or a one-piece garment or a sleeping outfit that includes both a top and a separate bottom, so long as the garment can hold a magnet. It should be appreciated that the one or more magnets 4 can be included at any location and in any piece of the sleeping garment(s) of the infant. For example, a first magnet of the one or more magnets 4 can be included in a top garment and a second magnet of the one or more magnets 4 can be included in a bottom garment separate from the top garment.

Figure 2:
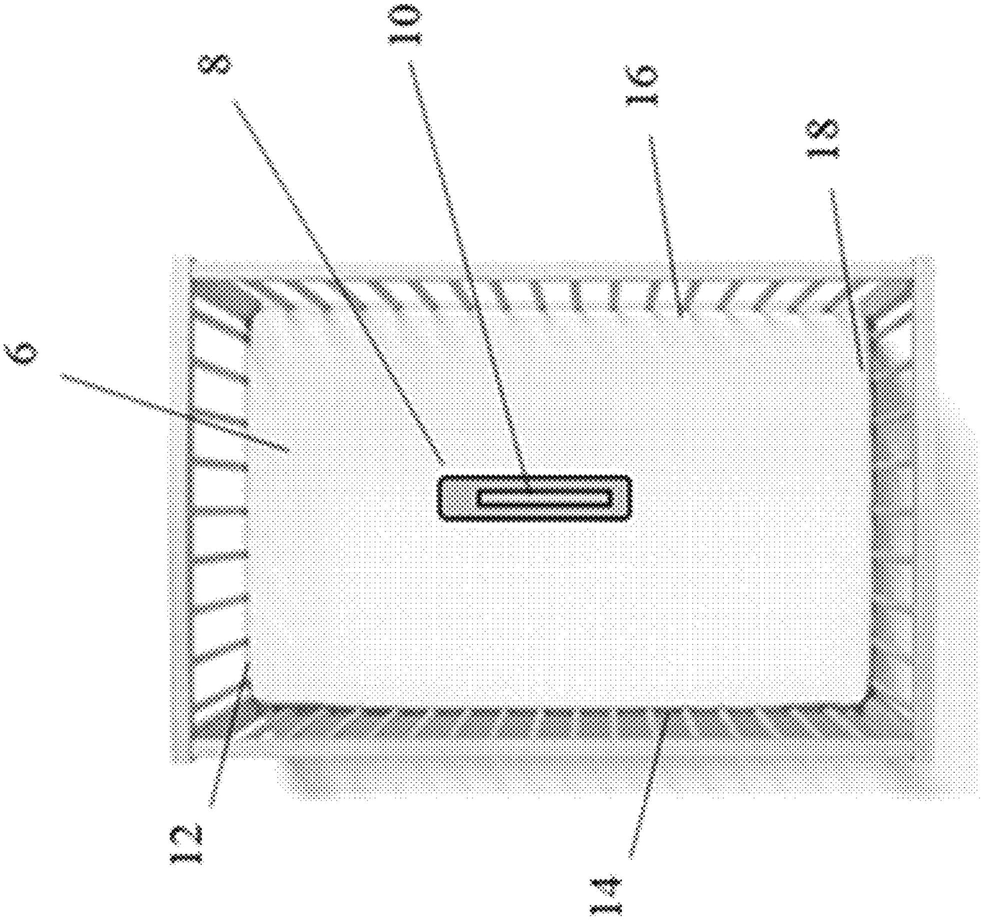
FIG. 2 is a top view of a sleeping surface, containing the magnets at the center according to one embodiment of the present disclosure.

In one embodiment, the at least one magnet 4 is a permanent magnet, with a function of connecting to a magnetic counterpart, which is the at least one magnet provided with a sleeping surface, discussed in more detail with respect to FIG. 2. Additionally, the at least one magnet 4 can have sufficient strength to hold an infant on their back, when interacting with the magnetic counterpart, to prevent the infant from rolling over from a starting supine sleeping position. The at least one magnet 4 can be, for example, a neodymium, samarium cobalt, or ferrite magnet, among others.

In one embodiment, the at least one magnet 4 can be secured to an outer surface of the infant garment 2 and/or can be secured within one or more layers of the infant garment 2. Additionally or alternatively, the at least one magnet 4 can have a portion of the magnet secured within the garment 2, while a portion of the same magnet can have an exposed surface outside of the garment 2.

In one embodiment, the at least one magnet 4 can be secured to the back region 3, for example by including the at least one magnet 4 in a pocket or casing to secure the at least one magnet 4 in its desired position. In one embodiment, the at least one magnet 4 can be removably secured within the pocket or casing so that the at least one magnet 4 can be removed for any reason, such as removing before washing the infant garment 2.

The at least one magnet 4 provided with the infant garment 2 can be oriented so that it at least generally extends along a longitudinal direction of the spine of the infant. Positioning the at least one magnet 4 along the direction of the spine of the infant, allows the infant garment 2 to maintain the infant in a desired sleeping position due to the attractive forces between the magnets being located at a longitudinal center of the back of the infant. This positioning of the magnets allows the attractive forces to be centralized on the infant's body, while also allowing the arms, legs and head of the infant to freely move.

It should be appreciated that the at least one magnet 4 can be oriented at an angle with respect to the longitudinal direction of the spine, for example at an angle of around 1 degree to 10 degrees. In a further example, the at least one magnet can be oriented at an angle of around 1 degree to 5 degrees with respect to the spine. One or more embodiments of the invention allow for any desired orientation of the at least one magnet 4 which sufficiently utilizes the attractive force between the at least one magnet 4 and a corresponding at least one magnet associated with a surface on which the infant is sleeping, as discussed in more detail with respect to FIG. 2.

In one embodiment, a plurality of the at least one magnets 4 can be provided along the back region 3 of the infant garment 2. The plurality of the at least one magnets 4 can be intermittently spaced along the back region 3 and can extend from an area of a neck of the infant garment 2 to an area at a lower side of the back region 3.

In one embodiment, the plurality of the at least one magnets 4 can be spaced apart and oriented along the back region 3 in a single linear pattern. In one embodiment, the plurality of the at least one magnets 4 can form two columns extending along either side of the back region 3. In one embodiment, the plurality of the at least one magnets 4 can be alternately arranged on both sides of the back region 3.

The at least one magnet 4 can be any shape or size, which allows for the at least one magnet 4 to not cause discomfort for the infant while sleeping.

In one embodiment, different size and/or power of the magnets can be used for different locations along the back region 3. For example, larger magnets can be used at or near a top of the back region 3 to provide a stronger attractive force near a top side of the infant where a swinging motion of an infant's arms can cause the greatest rotational force from the infant and cause the infant to roll over from a sleeping position on its back to a sleeping position on its stomach.

Additionally or alternatively, in one embodiment, larger and/or more powerful magnets can be used at a lower end of the back region 3 to compensate for any curvature of the spine that would cause magnets in the garment 2 at the lower end to be spaced further from the magnets associated with the sleeping surface or to account for rotational forces created by movement of an infant's legs. Having larger and/or more powerful magnets at the lower end could help the magnets maintain the attractive force with the magnets provided with the sleeping surface.

FIG. 2 shows a top view of a sleeping surface 6 according to one or more embodiments of the invention. In one embodiment, as shown in FIG. 2, the sleeping surface 6 has a left edge 14 and right edge 16, which can be parallel in relation to each other. In one embodiment, the sleeping surface 6 also has a top edge 12 and a bottom edge 18, which can be parallel to each other. That is, the sleeping surface 6 can be rectangular. Any sized or shaped sleeping surface is within the spirit and scope of the present invention.

The sleeping surface 6 additionally has a sufficient depth to provide a comfort to the sleeping infant as well as provide enough depth to include at least one magnet 10. As shown in FIG. 2, the at least one magnet 10 can be embedded in at least one hollow cavity 8 in the sleeping surface 6. The at least one hollow cavity 8 can be oriented so that it generally extends in a length direction from the top edge 14 to the bottom edge 16, and at some location between the left edge 14 and the right edge 16 of the sleeping surface 6. The at least one magnet 10 can be, for example, a neodymium, samarium cobalt, or ferrite magnet, among others.

The at least one hollow cavity 8 can be disposed at any desired region of the sleeping surface. In one embodiment, the at least one hollow cavity 8 is disposed equidistant from the left edge 14 and right edge 16 and disposed equidistant from the top edge 14 and bottom edge 16. That is, the at least one hollow cavity 8 can be disposed at a center region of the sleeping surface 6. In this way, the infant can be positioned on a top surface of the sleeping surface 6 in the center region of the sleeping surface 6.

Arrangement of the at least one hollow cavity 8 at least generally in the center region of the top surface of the sleeping surface 6 ensures that the infant is secured while also allowing the infant to freely move their arms, legs, and head. By allowing the infant to move their head, this also helps prevent positional head flattening plagiocephaly and/or brachycephaly, which can result in the early stages of life if an infant is lying on a flat surface for too long without sufficient movement. Further, by allowing freedom of movement of an infant's head, research has found that wiggling during sleep is better for a child's motor development.

In one embodiment, the at least one magnet 10 can be any shape or size as long as the at least one magnet 10 can be secured at least partially within the hollow cavity 8 and prevented from being inadvertently removed from the hollow cavity 8. The at least one magnet 10 can be removably secured within a pocket or casing in the hollow cavity 8 so the at least one magnet 10 can be secured therein while also being removable for any reason. For example, the at least one magnet 10 can include a hook and loop type fastener or similar to keep it secured in position with respect to the hollow cavity 8. The at least one magnet 10 can also be secured to the hollow cavity 8 in a manner that it is not easily removable, such as using an adhesive to secure the at least one magnet 10 to the sleeping surface 6.

It should be appreciated that the at least one hollow cavity 8 can vary in shape, size, and depth, which will accommodate the at least one magnet 10 having one or more sizes and shapes.

In one embodiment, a top surface of the at least one magnet 10 fits within the hollow cavity 8 so that the top surface of the at least one magnet 10 is substantially planar with a top surface of the sleeping surface 6. In this way, the sleeping surface 6 and the at least one magnet 10 form a continuous comfortable sleeping surface for the back of the infant, while also providing the advantages of the invention of maintaining the infant is the desired sleeping position on its back due to the attractive forces between the magnets.

In one embodiment, the top surface of the at least one magnet 10 can be recessed into the hollow cavity 8 at a depth below a top surface of the sleeping surface 6. In this way, the one or more magnets 4 provided with the garment can extend at least partially into the hollow cavity 8 before making contact and being secured to the at least one magnet 10 within the hollow cavity 8. By having the at least one magnet 10 positioned completely in the hollow cavity 8 and the at least one magnet 4 at least partially within the hollow cavity 8, side surfaces of both magnets can contact an interior surface of the hollow cavity 8. Therefore, movement of the infant can be restrained by not only the attractive forces between the at least one magnet 4 and the at least one magnet 10 (herein also referred to as "the magnets 4 and 10"), but also contact between the side surfaces of the magnets 4 and 10 and the interior surface of the hollow cavity 8, which will help restrict lateral movement of the infant and help prevent disengagement between the magnets 4 and 10.

It should be appreciated that the at least one magnet 4 can extend any distance into the hollow cavity 8, for example completely within the hollow cavity 8, which will allow the attractive surfaces of the magnets 4 and 10 to be in contact while also maximizing the comfort for the infant while sleeping.

One or more embodiments of the invention allow for any desired orientation of the at least one magnet 10 which maximizes an attractive force between the at least one magnet 10 and the corresponding at least one magnet 4 associated with the garment the infant is sleeping in, as discussed with respect to FIG. 1.

In one embodiment, a plurality of the at least one magnet 10 can be spaced apart in a plurality of the hollow cavity 8. The plurality of the hollow cavity 8 can be intermittently spaced along the sleeping surface 6 and can extend for any amount of distance between the top edge 14 and the bottom edge 16 of the sleep surface 6. It should be appreciated that any number or position of the at least one magnet 4 provided with the garment can be matched by a corresponding number and arrangement of the at least one magnet 10 provided with the sleeping surface 6.

In one embodiment, different size and/or strength of the magnets can be used for different locations along the sleeping surface 6. For example, larger magnets could be used at or near a top of the at least one hollow cavity 8 to provide a stronger attractive force near a top side of the infant. Additionally or alternatively, larger and/or more powerful magnets could be used at a lower end of the at least one hollow cavity 10 to compensate for any curvature of the spine that would cause magnets in the sleeping surface 6 to be spaced further from the magnets associated with the infant's garment discussed in FIG. 1.

Figure 3A:
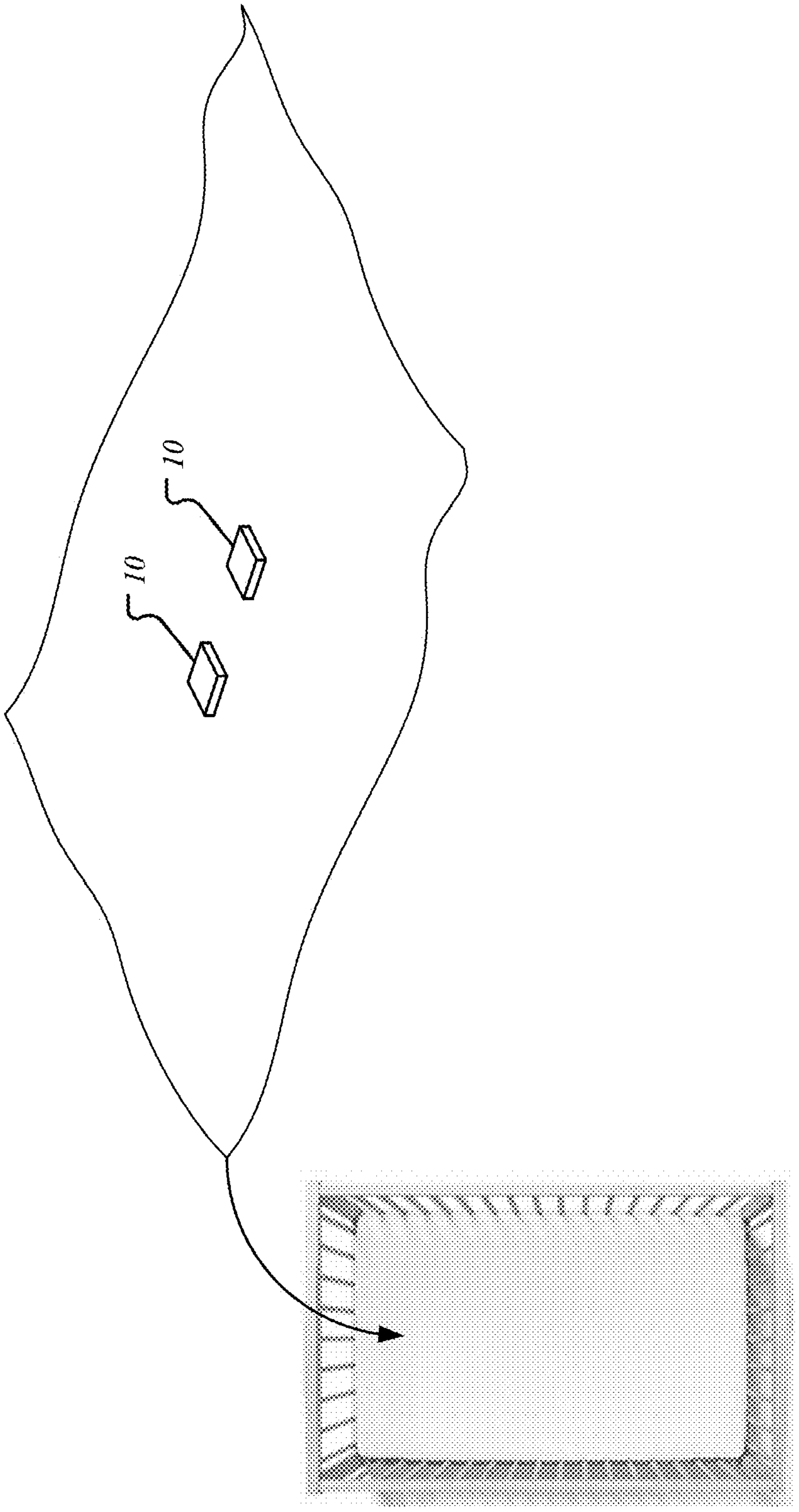
FIG. 3A is a schematic of the at least one magnet included in a fabric, according to one embodiment of the present disclosure.

FIG. 3A is a schematic of the at least one magnet 10 included in a fabric, according to one embodiment of the present disclosure. In one embodiment, the at least one magnet 10 can be included in a fabric configured to cover the sleeping surface 6. For example, the fabric can be a mattress sheet, such as a flat or fitted mattress sheet. The fabric can be secured to the sleeping surface 6 via, for example, elastics included in corners of the fabric configured to wrap around corners of the sleeping surface 6 (e.g., the fitted mattress sheet). The fabric can be secured to the sleeping surface 6 via, for example, excess material tucked under the sleeping surface 6 (the mattress) and secured to an excess of material tucked under an opposite side of the sleeping surface (e.g., secured using straps, bands, string, etc.). The fabric can be sized similar to dimensions of the sleeping surface 6 and secured to the sleeping surface 6 via, for example, an adhesive, sown into the sleeping surface 6, reversibly fastened to the sleeping surface 6 (e.g., clamps, pins, etc.), or hook and loop, among others.

In one embodiment, the at least one magnet 10 can be reversibly or irreversibly coupled to the fabric. For example, the at least one magnet 10 can be disposed in a sleeve or pocket and the at least one magnet 10 can be removed from the sleeve or pocket to allow laundering of the fabric. The sleeve or pocket can be, for example, a patch of additional material sown into the fabric and include at least one edge that is open or can be reversibly closed. The at least one edge can be reversibly closed by, for example, a zipper, button snaps, a knot, hook and loop, magnets, etc. For example, the at least one magnet 10 can be attached to the fabric via, for example, an adhesive, a sleeve or pocket with no reversible closure, rivets, etc. Advantageously, the fabric having the at least one magnet 10 can be purchased separately and used with existing bassinets or crib mattresses.

Figure 3B:
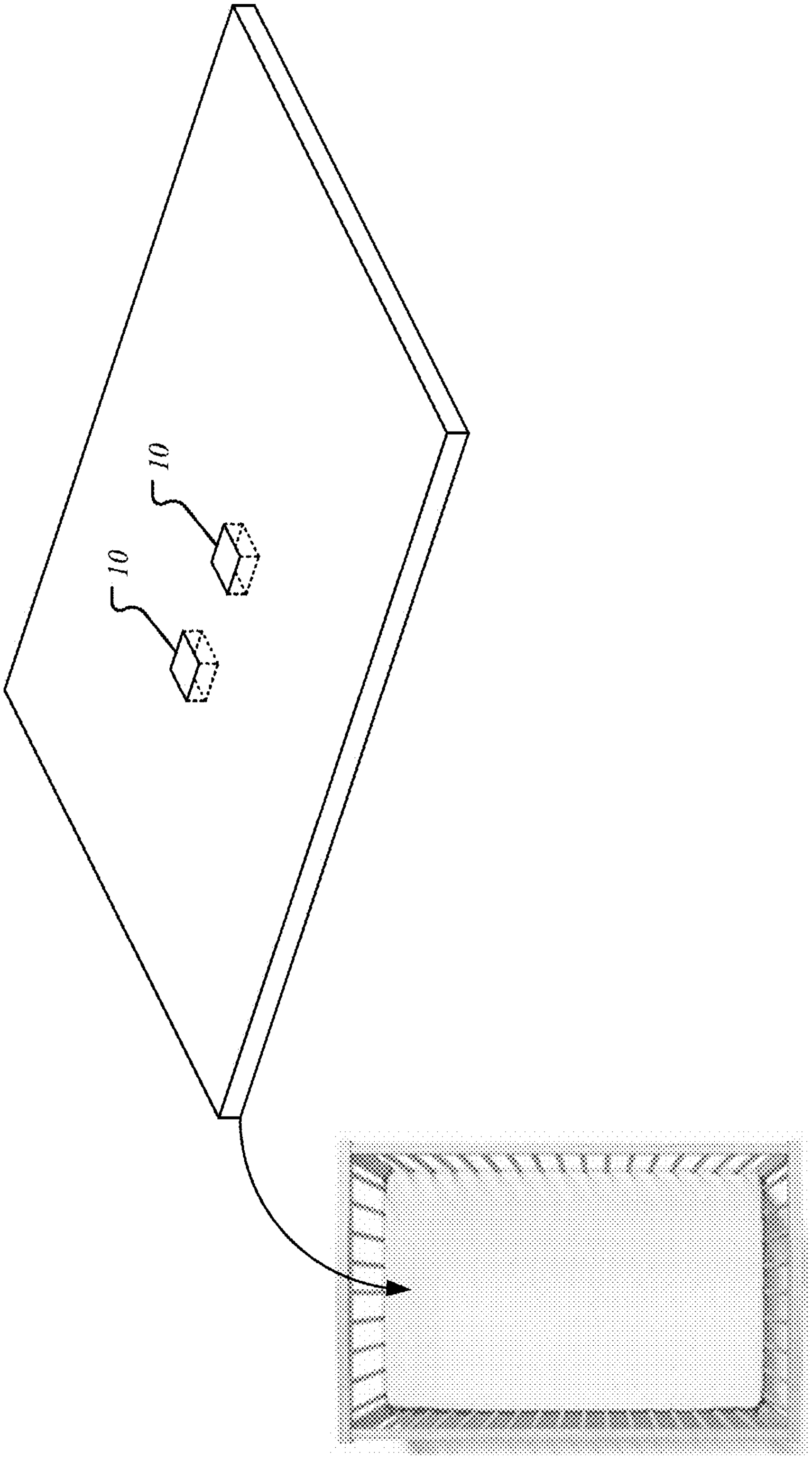
FIG. 3B is a schematic of the at least one magnet included in a pad, according to one embodiment of the present disclosure.
Figure 3C:
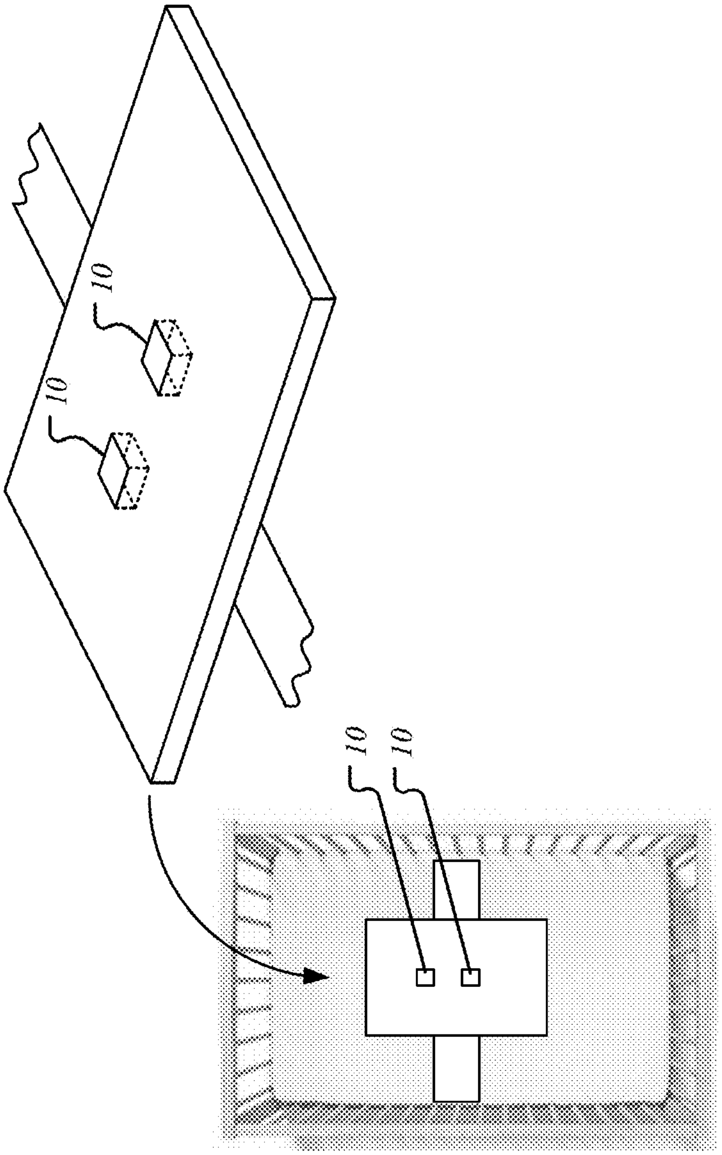
FIG. 3C is a schematic of the at least one magnet included in a portable pad, according to one embodiment of the present disclosure.

FIG. 3B is a schematic of the at least one magnet 10 included in a pad, according to one embodiment of the present disclosure. FIG. 3C is a schematic of the at least one magnet 10 included in a portable pad, according to one embodiment of the present disclosure. In one embodiment, the at least one magnet can be included in a pad. The pad can have a thickness similar to a thickness of the at least one magnet 10 in order to increase the comfort of the infant when sleeping on the pad having the at least one magnet 10 included therein. That is, the pad including the at least one magnet 10 can present a substantially planar surface upon which the infant can sleep. The pad can be a "sleep-safe" pad and present a reduced risk of asphyxiation to the infant sleeping on the pad. The pad can have various sizes. For example, the pad can be sized to an approximate size of the existing bassinet or crib (FIG. 3B). For example, the pad can be sized to an approximate size of the infant (FIG. 3C). For example, the pad can come in one size that can be customized by the customer (parent) via cutting the pad to fit any bassinet or crib. The pad can be coupled or secured to an underlying mattress via any of the previously described reversible or irreversible coupling examples. For example, the pad can be sized to an approximate size of the infant and edges of the pad can be secured to the underlying mattress via attached adjustable straps that can wrap around the mattress. This can provide an advantage of being small and portable for traveling, while the straps can allow the pad to be used with various mattress sizes. For example, the pad can be sized to an approximate size of the existing (home) bassinet or crib and the pad need not be secured to the underlying mattress since the pad can be sufficiently large to not fold over in the case the infant rolls. Of course, the pad can optionally be secured by the previously described adjustable straps, clamps, pins, adhesive, corner elastics, etc.

In one embodiment, the fabric or the pad need not be used on a mattress or in a crib or bassinet. That is, the fabric or the pad including the at least one magnet 10 can be used on their own. For example, the fabric or the pad including the at least one magnet 10 can be used as a play mat, which can be placed on the floor, tabletop, changing pad, or generally any surface.

Figure 4A:
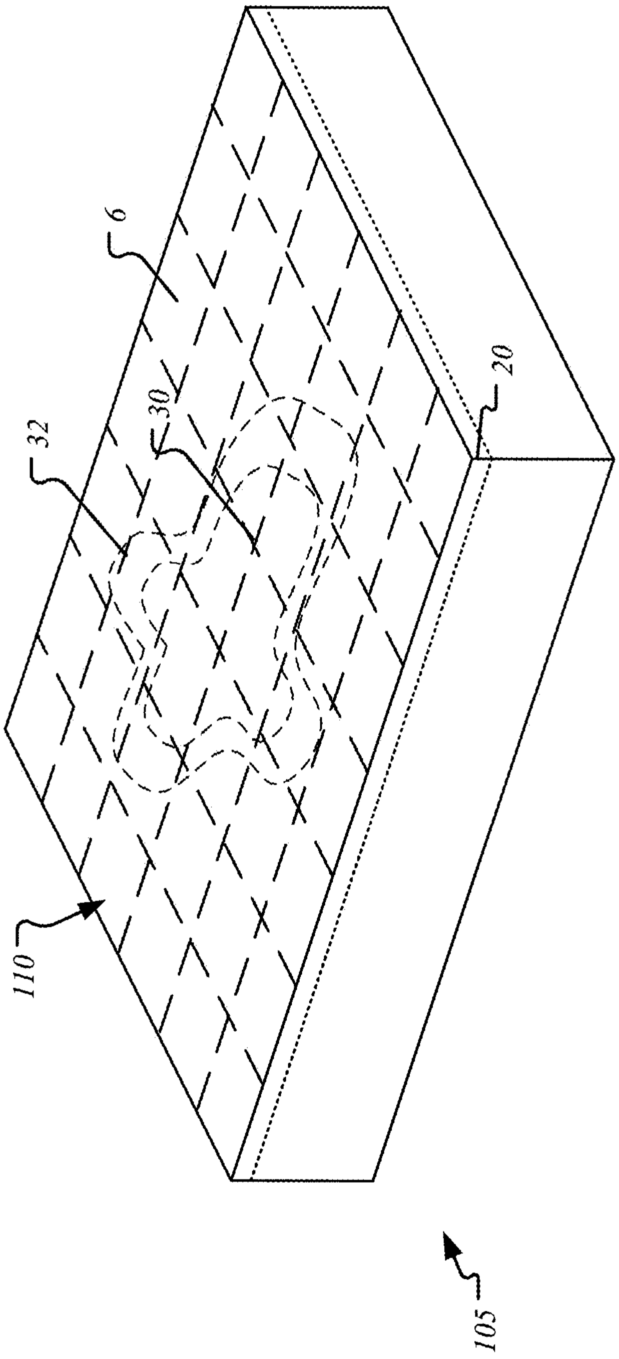
FIG. 4A is a schematic of a pressure-sensing mattress with adjustable magnets, according to one embodiment of the present disclosure.

FIG. 4A is a schematic of a pressure-sensing mattress with adjustable magnets, according to one embodiment of the present disclosure. In one embodiment, the sleeping surface 6 is part of a top layer 20 in a mattress 105. The top layer 20 can be configured to detect an object disposed on the top layer 20 and applying a force on the top layer 20. For example, the top layer 20 can include a plurality of sensors 110 arranged in an array. The plurality of sensors 110 can be configured to sense an applied pressure. For example, the plurality of sensors 110 can be capacitive pressure sensors. In one embodiment, the plurality of sensors 110 can be electronically coupled to circuitry (not shown) configured to receive a transmitted signal from the plurality of sensors 110. The circuitry can be communicatively coupled to processing circuitry, such as a computing device. The computing device can be, for example, a smart phone wirelessly coupled to the circuitry via Bluetooth or Wi-Fi, and can include an application (app) or software for interacting with the circuitry and the plurality of sensors 110. The computing device can be, for example, a desktop computer or laptop or similar device connected via a wired connection (ethernet, USB, etc.) and can include an app or software for interacting with the circuitry and the plurality of sensors. Of course, the smart phone can be coupled via a wired connection and the desktop computer can be coupled via a wireless connection. The transmitted signal can include data describing a location and measured force from any one or all of the plurality of sensors 110. The plurality of sensors 110 can detect and measure, for example, the infant disposed on the plurality of sensors 110. The plurality of sensors 110 can have a resolution based on a number of the plurality of sensors 110 included in the array, similar to pixels in an image where each sensor of the plurality of sensors 110 can act like an individual pixel. In one embodiment, the each sensor of the plurality of sensors 110 can further include sub-sensors or sub-pixels for higher resolution location and force detection.

In one embodiment, the force (or pressure) applied by the infant's body on the plurality of sensors 110 can be detected by the plurality of sensors 110 and a first footprint 30 can be determined by the circuitry (e.g., via the plurality of sensors 110 transmitting the detected location and force or pressure information to the circuitry and/or the computing device). For example, the first footprint 30 can correspond to an infant that is 1 month old. In one embodiment, the computing device can determine, based on the detected first footprint 30, an arrangement for the at least one magnet 10. The determined arrangement can minimize a likelihood of the infant rolling over. A location of the at least one magnet 10 can be automatically or manually adjusted. For example, a user (e.g., a parent) can receive the determined arrangement via the user's smart phone, and the user can manually arrange the at least one magnet 10 according to the described or displayed determined arrangement. For example, the mattress 105 can include an adjustment device coupled to the circuitry and configured to adjust the position of the at least one magnet 10, such as a motor. In such an example, the mattress 105 can include an adjustable system for securing the at least one magnet 10 in place while also allowing relocation or adjustment of the at least one magnet 10 when needed, and the system can be coupled to the adjustment device. For example, the adjustable system can be an adjustable rail or adjustable platform system.

In one embodiment, as the infant grows, a footprint of the infant can change. Thus, as shown in FIG. 4A, the plurality of sensors 110 can detect a second footprint 32 when the infant is disposed on the array. For example, the second footprint 32 can correspond to the infant that is 3 months old. Notably, due to the larger size of the 3-month-old infant, the arrangement of the at least one magnet 10 can be adjusted to further minimize a likelihood of the 3-month old infant rolling over.

Figure 4B:
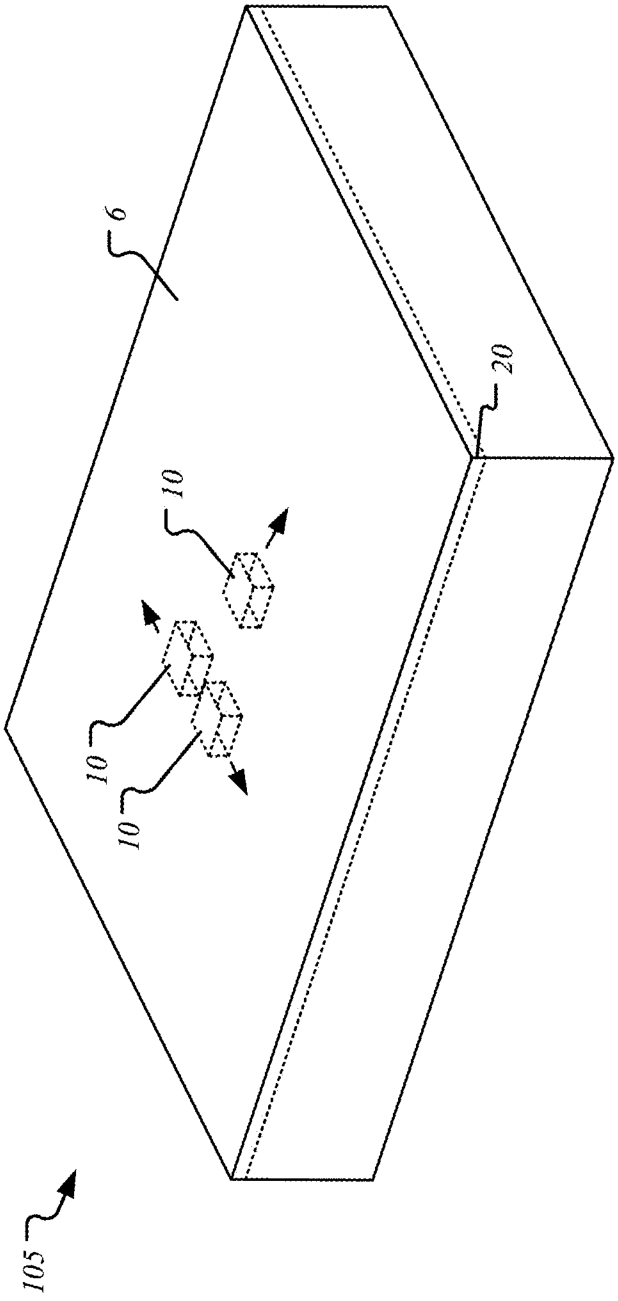
FIG. 4B is a schematic of the pressure-sensing mattress with adjustable magnets being adjusted, according to one embodiment of the present disclosure.

To this end, FIG. 4B is a schematic of the pressure-sensing mattress with adjustable magnets being adjusted, according to one embodiment of the present disclosure. In one embodiment, the infant can wear the garment 2 having three magnets of the at least one magnet 4. The three magnets can be arranged, for example, in a triangle shape where two of the three magnets are disposed near shoulders of the infant and the third magnet is disposed near a lower lumbar of the infant. Since the 3-month old infant has grown, the shoulders of the infant have grown further apart from one another, and the lumbar of the infant has shifted away from the shoulders. Thus, in one embodiment, three corresponding magnets of the at least one magnet 10 can be adjusted. As shown in FIG. 4B, two magnets (corresponding to the two shoulder magnets of the at least one magnet 4) can be adjusted further apart orthogonal to the longitudinal direction, and one magnet (corresponding to the lumbar magnet of the at least one magnet 4) can be adjusted further apart from the two corresponding should magnets along the longitudinal direction. In one embodiment, the user can manually adjust or move the three at least one magnet 10. In one embodiment, the adjustment device (the motor) in the mattress 105 can receive a signal from the circuitry or computing device to actuate and adjust the position of the three at least one magnet 10 via the adjustable system.

The garment 2 worn by the infant having the three magnets of the at least one magnet 4 can be elastic, and (i) the two shoulder magnets of the at least one magnet 4 can adjust wider while staying coupled to the garment 2, and (ii) the lumbar magnet of the at least one magnet 4 can adjust further away from the two shoulder magnets while staying coupled to the garment 2. In one embodiment, the garment 2 worn by the 3-month-old infant is different from the garment 2 worn by the 1-month-old infant. The garment 2 worn by the 3-month-old infant can include the same three magnets of the at least one magnet 4, but the arrangement of the three magnets can be updated. For example, pocket locations for securing the three magnets can be updated to be wider in the shoulders and have a greater distance from the lumbar to the shoulders. When the 3-month=old infant is arranged on the sleeping surface 6, the plurality of sensors 110 can detect the second footprint 32 and adjust the three magnets of the at least one magnet 10, which can generally align with the pocket locations in the 3-month old infant garment 2.

In one embodiment, the garment 2 can include an identifying feature that can be detected by the plurality of sensors 110. For example, the identifying feature is an NFC tag describing the arrangement of the at least one magnet 4 on the garment 2, and the plurality of sensors 110 includes an NFC sensor configured to detect the NFC tag for various versions of the garment 2 (newborn size, 0-3 M size, 3-6 M size, 6-9 M size, etc.). For example, the identifying feature is an optical pattern, such as a QR code, and the plurality of sensors 110 includes an imaging device configured to detect the optical pattern.

In one embodiment, upon detecting the second footprint 32, instead of adjusting the arrangement of the at least one magnet 10, the user can be alerted to replace the at least one magnet 10 with a stronger magnet. When the at least one magnet 10 is included in the fabric (mattress pad or fabric sheet), this can allow the user to keep the same pockets or sleeves holding the magnets in the fabric while still decreasing the roll risk.

In one embodiment, upon detecting the second footprint 32, instead of adjusting the arrangement of the at least one magnet 10, the user can be alerted to replace the entire fabric (mattress pad or fabric sheet) including a first arrangement of the at least one magnet 10 with a new fabric (mattress pad or fabric sheeting) including a second arrangement of the at least one magnet based on the larger size of the infant (the second footprint 32). Thus, new fabrics can used that have magnets arranged differently to accommodate for infant growth.

In one embodiment, the mattress 105 includes a power source electrically coupled to the at least one magnet 10, and the at least one magnet 10 is an electromagnet. The electromagnet can be configured to attract and couple to the at least one magnet 4 as previously described. Advantageously, the electromagnet can have an adjustable magnetic force. The magnetic force can be adjusted by varying an output power of the power source. The power source can be coupled to the circuitry and the computing device. Upon determining, via the plurality of sensors 110, that the infant is attempting to roll due to the detected footprint changing, the computing device can transmit a signal to the power source to increase a magnetic force of the electromagnet to try and prevent the infant from rolling.

In one embodiment, the garment 2 can include the at least one magnet 4 also in a front of the garment 2. Upon determining, via the plurality of sensors 110, that the infant is attempting to roll due to the detected footprint changing, the computing device can transmit a signal to the power source to increase the magnetic force of the electromagnet as previously described to prevent the roll. However, in the case where the infant successfully breaks the magnetic force and rolls onto its stomach, the plurality of sensors 110 can detect (and confirm) that the infant is, in fact, disposed on its stomach. For example, a machine learning model or neural network trained on pressure footprints of infants on their stomachs can be used to identify the infant is disposed on its stomach. Upon determining the infant is disposed on its stomach, the computing device can alert the user or infant's caregiver (described further below) while also transmitting a signal to the power source to reverse a polarity of the electromagnet to apply a repulsive force against the at least one magnet 4 in the front of the garment 2. Additionally, the plurality of sensors 110 can detect and determine the infant's footprint while on its stomach and determine an arrangement of the at least one magnet in the front of the garment. Then, the adjustment system can adjust the location of the electromagnet(s) to align with the arrangement of the at least one magnet 4 in the front of the garment 2 to increase an effectiveness of the repulsive force of the electromagnet against the at least one magnet 4 in the front of the garment 2. In doing so, the repulsive force can push or force the infant into a more advantageous arrangement or orientation to prevent asphyxiation against the sleeping surface 6.

In one embodiment, if the infant rotates from a position sleeping on its back to any other position and therefore overcomes the breakaway force between the associated magnets, an alarm can be generated to alert the infant's caregiver that the infant has moved from its desired position.

The alarm can be an audio alarm and/or visual alarm provided to the caregiver by way of an infant monitor or infant monitoring app. It should be appreciated that any type of notice provided to the caregiver that the infant has rotated from a position on its back, is within the spirit and scope of this invention.

Figure 4C:
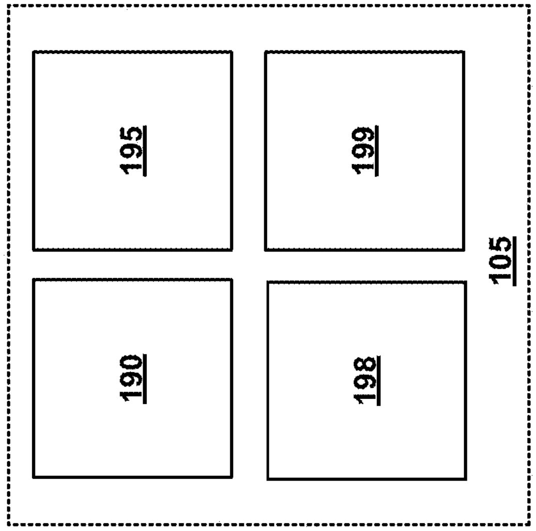
FIG. 4C is a schematic of a mattress and components included therein, according to one embodiment of the present disclosure.

FIG. 4C is a schematic of the mattress 105 and components included therein, according to one embodiment of the present disclosure. In one embodiment, as previously described, the mattress 105 can include an adjustable system 190, such as the adjustable rail or adjustable platform system. The mattress 105 can include the adjustable system 190 for securing the at least one magnet 10 in place while also allowing relocation or adjustment of the at least one magnet 10 when needed. In one embodiment, as previously described, the mattress 105 can include an adjustment system 195. The adjustment device 195, such as a motor, in the mattress 105 can receive a signal from the circuitry or computing device to actuate and adjust the position of the three at least one magnet 10 via the adjustable system 190. Thus, the adjustment device 195 can be coupled to the adjustable system 190. In one embodiment, as previously described, the mattress 105 can include a power source 198. The power source 198 can be electrically coupled to the at least one magnet 10, the adjustable system 190, and the adjustment device 195. In one embodiment, as previously described, the mattress 105 can include circuitry 199. The circuitry 199 can be, for example, processing circuitry. The circuitry 199 can be electrically connected to the adjustable system 190 and the adjustment device 195. Of course, the components of the mattress 105 therein can be optionally included or excluded, and need not be coupled to every other component therein. That is, any combination of the aforementioned components can be included in the mattress 105 in order to accomplish the previously described methods and features.

A device is provided to help reduce the incidence of positional flattening of the infant's head by plagiocephaly and/or brachycephaly, which is discussed in U.S. Pat. No. 8,186,354, which is hereby incorporated by reference in its entirety. The one or more embodiments of the present invention discussed herein can be used in combination with these mentioned systems.

While there has been described what is presently considered to be the preferred embodiments of the invention, it will be obvious to those skilled in the art that various changed and modifications may be made therein without departing from the invention whose scope is limited only by the following claims.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

Figure 5:
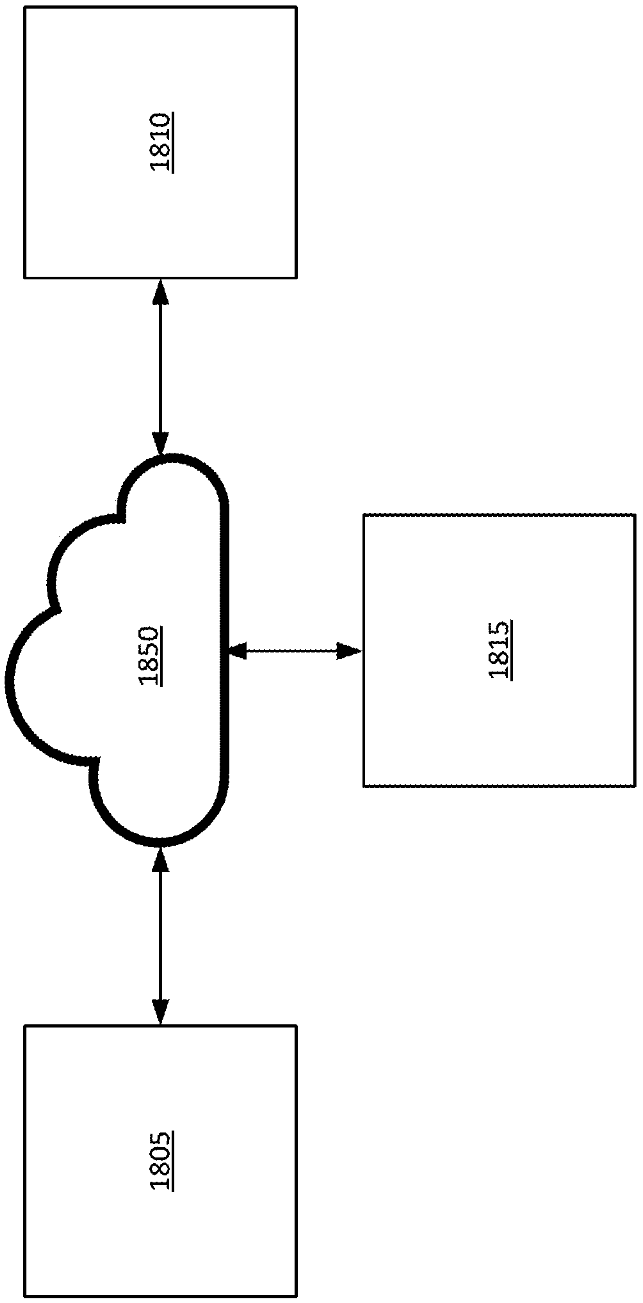
FIG. 5 is a schematic view of user devices communicatively connected to a server, according to an embodiment of the present disclosure.

FIG. 5 is a schematic view of a system 1800, according to an embodiment of the present disclosure. In an embodiment, the system 1800 can include a first device 1805, such as the mattress 105, communicatively connected to a second electronic device 1810, such as a server, via a network 1850. A third electronic device 1815, such as a computer or smart phone, can be communicatively connected to the first device 1805 and the second electronic device 1810. The devices can be connected via a wired or a wireless connection. The connection between, for example, the first device 1805 and the second electronic device 1810 can be via the network 1850, wherein the network 1850 is wireless or wired. In an embodiment, the first device 1805 can be configured to obtain data from the user (of the first device 1805), such as an input relating to the infant. Notably, the first device 1805 can transmit the data over the communication network 1850 to the networked second electronic device 1810 and/or the third electronic device 1815.

In an embodiment, the first electronic device 1805 need not be communicatively coupled to the other device or the network 1850. That is, the method described herein can be run entirely on the first device 1805 using the obtained data.

Figure 6:
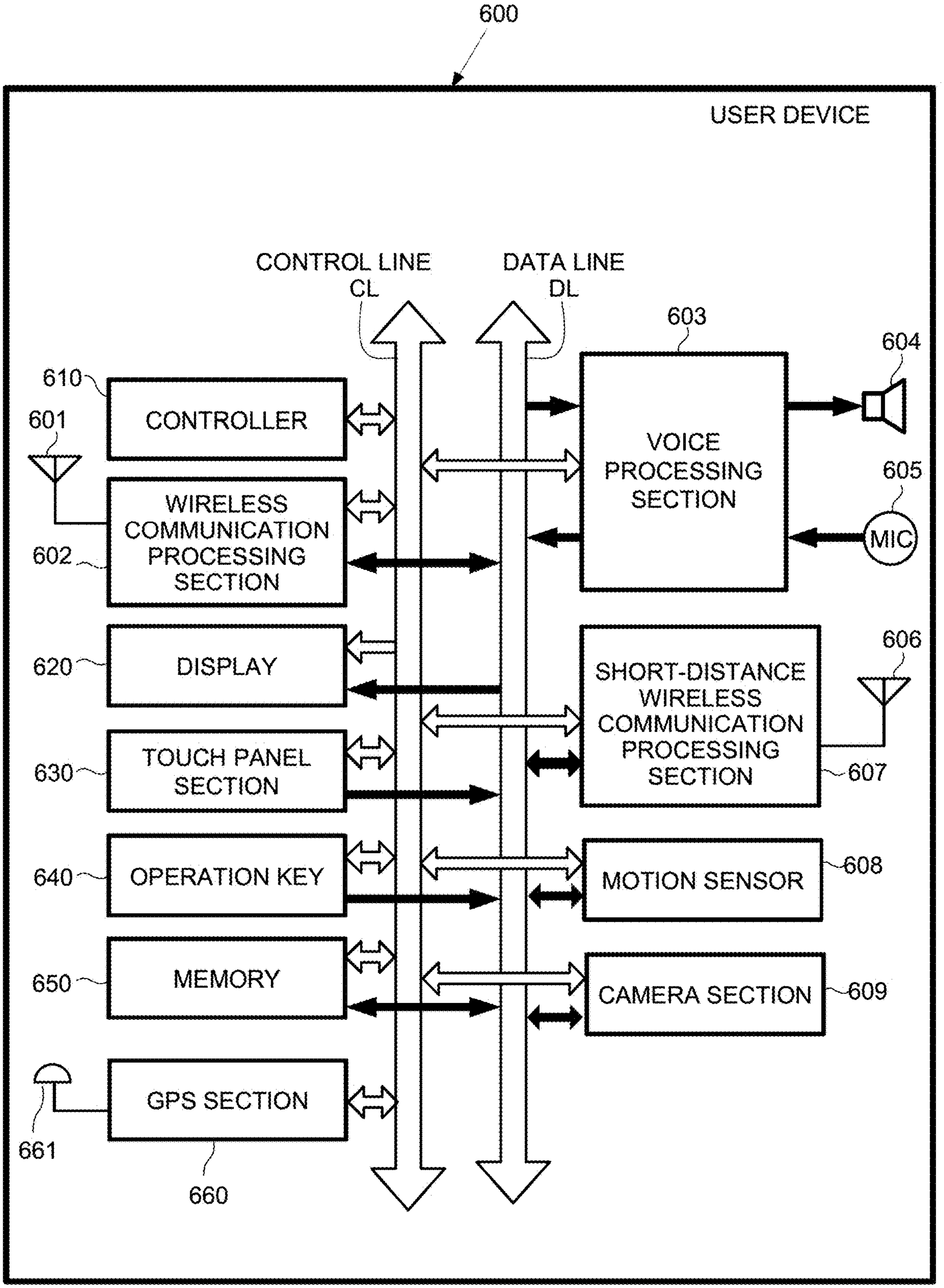
FIG. 6 is a block diagram illustrating an electronic user device, according to an embodiment of the present disclosure.
Figure 7:
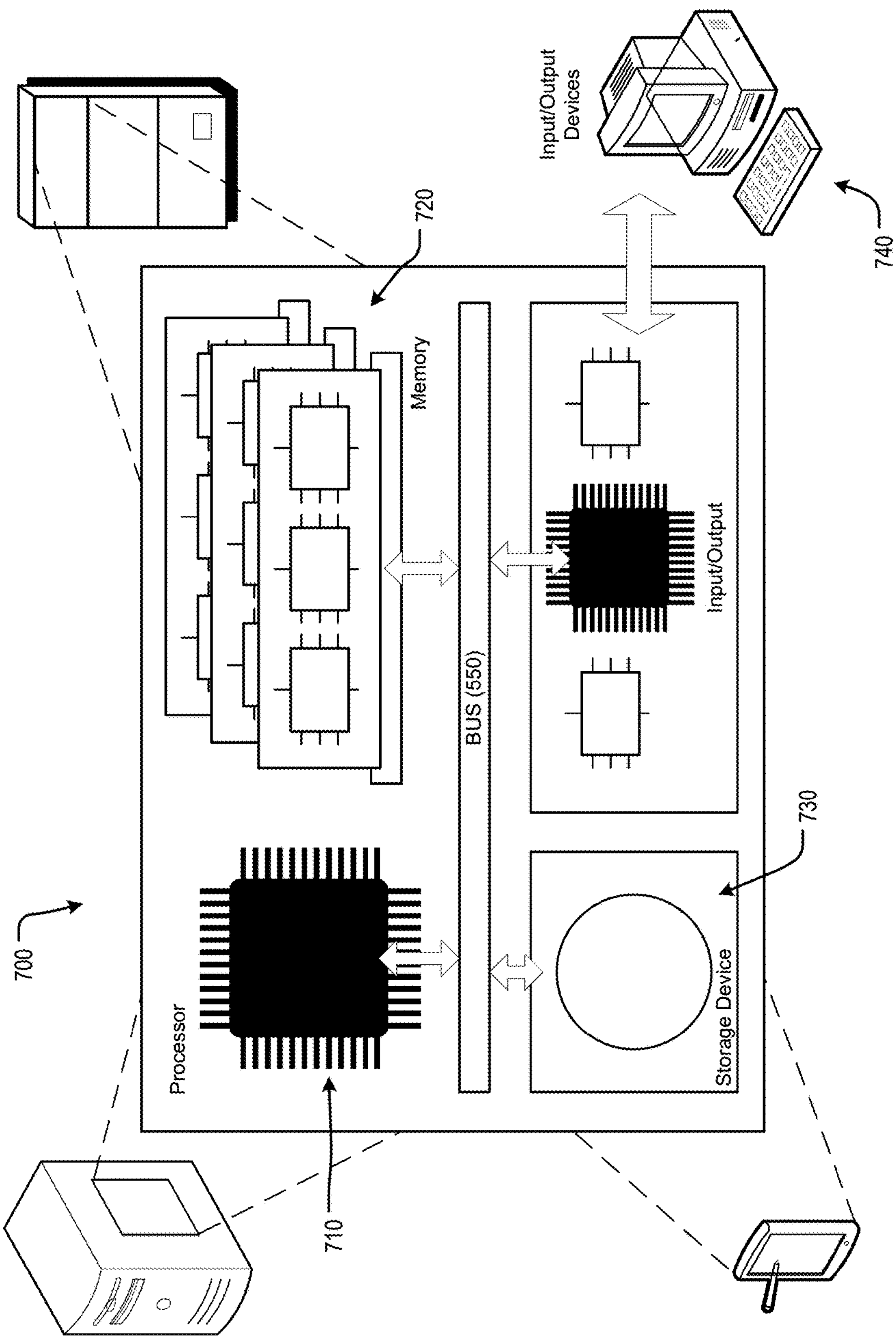
FIG. 7 is a schematic of a hardware system for performing a method, according to an embodiment of the present disclosure.
Figure 8:
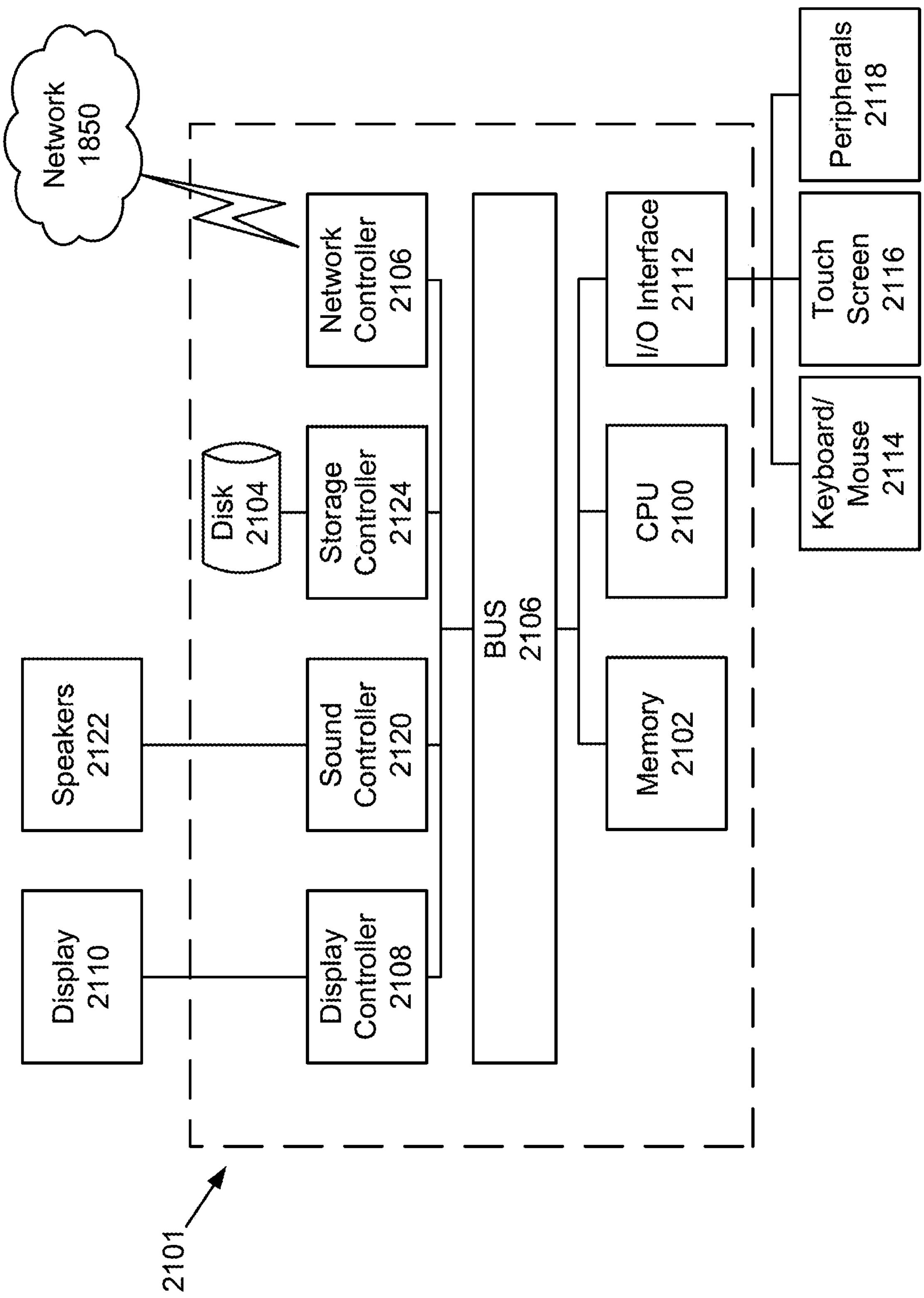
FIG. 8 is a schematic of a hardware configuration of a device for performing a method, according to an embodiment of the present disclosure.

In an embodiment, the first device 1805 can include a central processing unit (CPU), among other components (discussed in more detail in FIGS. 6-8). An application can be installed or accessible on the first device 1805 for executing the methods described herein. The application can also be integrated into an operating system (OS) of the first device 1805. The first device 1805 can be or include integrated therein any electronic device such as, but not limited to, a smart-phone, a personal computer, a tablet pc, a smart-watch, a smart-television, an interactive screen, an IoT (Internet of things) device, or the like. Although the above description was discussed with respect to the first device 1805, it is to be understood that the same description applies to the other devices (1810 and 1815) of FIG. 5.

The computing system can include clients (user devices) and servers. A client and server are generally remote from each other and typically interact through a communication network. The relationship of client and server arises by virtue of computer programs running on the respective computers and having a client-server relationship to each other. In an embodiment, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Electronic device 600 shown in FIG. 6 can be an example of one or more of the devices shown in FIG. 5. In an embodiment, the device 600 may be a smartphone. However, the skilled artisan will appreciate that the features described herein may be adapted to be implemented on other devices (e.g., a laptop, a tablet, a server, an e-reader, a camera, a navigation device, etc.). The device 600 of FIG. 6 includes processing circuitry, as discussed above. The processing circuitry includes one or more of the elements discussed next with reference to FIG. 6. The device 600 may include other components not explicitly illustrated in FIG. 6 such as a CPU, GPU, main memory, frame buffer, etc. The device 600 includes a controller 610 and a wireless communication processor 602 connected to an antenna 601. A speaker 604 and a microphone 605 are connected to a voice processor 603.

The controller 610 may include one or more processors/processing circuitry (CPU, GPU, or other circuitry) and may control each element in the device 600 to perform functions related to communication control, audio signal processing, graphics processing, control for the audio signal processing, still and moving image processing and control, and other kinds of signal processing. The controller 610 may perform these functions by executing instructions stored in a memory 650. Alternatively, or in addition to the local storage of the memory 650, the functions may be executed using instructions stored on an external device accessed on a network or on a non-transitory computer readable medium.

The memory 650 includes but is not limited to Read Only Memory (ROM), Random Access Memory (RAM), or a memory array including a combination of volatile and non-volatile memory units. The memory 650 may be utilized as working memory by the controller 610 while executing the processes and algorithms of the present disclosure. Additionally, the memory 650 may be used for long-term storage, e.g., of image data and information related thereto.

The device 600 includes a control line CL and data line DL as internal communication bus lines. Control data to/from the controller 610 may be transmitted through the control line CL. The data line DL may be used for transmission of voice data, displayed data, etc.

The antenna 601 transmits/receives electromagnetic wave signals between base stations for performing radio-based communication, such as the various forms of cellular telephone communication. The wireless communication processor 602 controls the communication performed between the device 600 and other external devices via the antenna 601. For example, the wireless communication processor 602 may control communication between base stations for cellular phone communication.

The speaker 604 emits an audio signal corresponding to audio data supplied from the voice processor 603. The microphone 605 detects surrounding audio and converts the detected audio into an audio signal. The audio signal may then be output to the voice processor 603 for further processing. The voice processor 603 demodulates and/or decodes the audio data read from the memory 650 or audio data received by the wireless communication processor 602 and/or a short-distance wireless communication processor 607. Additionally, the voice processor 603 may decode audio signals obtained by the microphone 605.

The exemplary device 600 may also include a display 620, a touch panel 630, an operation key 640, and a short-distance communication processor 607 connected to an antenna 606. The display 620 may be an LCD, an organic electroluminescence display panel, or another display screen technology. In addition to displaying still and moving image data, the display 620 may display operational inputs, such as numbers or icons which may be used for control of the device 600. The display 620 may additionally display a GUI for a user to control aspects of the device 600 and/or other devices. Further, the display 620 may display characters and images received by the device 600 and/or stored in the memory 650 or accessed from an external device on a network. For example, the device 600 may access a network such as the Internet and display text and/or images transmitted from a Web server.

The touch panel 630 may include a physical touch panel display screen and a touch panel driver. The touch panel 630 may include one or more touch sensors for detecting an input operation on an operation surface of the touch panel display screen. The touch panel 630 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 630 may detect when the stylus approaches/contacts the operation surface of the touch panel display (similar to the case in which a finger is used for the touch operation).

In certain aspects of the present disclosure, the touch panel 630 may be disposed adjacent to the display 620 (e.g., laminated) or may be formed integrally with the display 620. For simplicity, the present disclosure assumes the touch panel 630 is formed integrally with the display 620 and therefore, examples discussed herein may describe touch operations being performed on the surface of the display 620 rather than the touch panel 630. However, the skilled artisan will appreciate that this is not limiting.

For simplicity, the present disclosure assumes the touch panel 630 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 630 may include transparent electrode touch sensors arranged in the X-Y direction on the surface of transparent sensor glass.

The touch panel driver may be included in the touch panel 630 for control processing related to the touch panel 630, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in an embodiment, the touch panel 630 may detect a position of a user's finger around an edge of the display panel 620 (e.g., gripping a protective case that surrounds the display/touch panel). Signals may be transmitted by the touch panel driver, e.g., in response to a detection of a touch operation, in response to a query from another element based on timed data exchange, etc.

The touch panel 630 and the display 620 may be surrounded by a protective casing, which may also enclose the other elements included in the device 600. In an embodiment, a position of the user's fingers on the protective casing (but not directly on the surface of the display 620) may be detected by the touch panel 630 sensors. Accordingly, the controller 610 may perform display control processing described herein based on the detected position of the user's fingers gripping the casing. For example, an element in an interface may be moved to a new location within the interface (e.g., closer to one or more of the fingers) based on the detected finger position.

Further, in an embodiment, the controller 610 may be configured to detect which hand is holding the device 600, based on the detected finger position. For example, the touch panel 630 sensors may detect a plurality of fingers on the left side of the device 600 (e.g., on an edge of the display 620 or on the protective casing), and detect a single finger on the right side of the device 600. In this exemplary scenario, the controller 610 may determine that the user is holding the device 600 with his/her right hand because the detected grip pattern corresponds to an expected pattern when the device 600 is held only with the right hand.

The operation key 640 may include one or more buttons or similar external control elements, which may generate an operation signal based on a detected input by the user. In addition to outputs from the touch panel 630, these operation signals may be supplied to the controller 610 for performing related processing and control. In certain aspects of the present disclosure, the processing and/or functions associated with external buttons and the like may be performed by the controller 610 in response to an input operation on the touch panel 630 display screen rather than the external button, key, etc. In this way, external buttons on the device 600 may be eliminated in lieu of performing inputs via touch operations, thereby improving watertightness.

The antenna 606 may transmit/receive electromagnetic wave signals to/from other external apparatuses, and the short-distance wireless communication processor 607 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 607.

The device 600 may include a motion sensor 608. The motion sensor 608 may detect features of motion (i.e., one or more movements) of the device 600. For example, the motion sensor 608 may include an accelerometer to detect acceleration, a gyroscope to detect angular velocity, a geomagnetic sensor to detect direction, a geo-location sensor to detect location, etc., or a combination thereof to detect motion of the device 600. In an embodiment, the motion sensor 608 may generate a detection signal that includes data representing the detected motion. For example, the motion sensor 608 may determine a number of distinct movements in a motion (e.g., from start of the series of movements to the stop, within a predetermined time interval, etc.), a number of physical shocks on the device 600 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 610, whereby further processing may be performed based on data included in the detection signal. The motion sensor 608 can work in conjunction with a Global Positioning System (GPS) section 660. The information of the present position detected by the GPS section 660 is transmitted to the controller 610. An antenna 661 is connected to the GPS section 660 for receiving and transmitting signals to and from a GPS satellite.

The device 600 may include a camera section 609, which includes a lens and shutter for capturing photographs of the surroundings around the device 600. In an embodiment, the camera section 609 captures surroundings of an opposite side of the device 600 from the user. The images of the captured photographs can be displayed on the display panel 620. A memory section saves the captured photographs. The memory section may reside within the camera section 609 or it may be part of the memory 650. The camera section 609 can be a separate feature attached to the device 600 or it can be a built-in camera feature.

An example of a type of computer is shown in FIG. 7. The computer 700 can be used for the operations described in association with any of the computer-implement methods described previously, according to one implementation. For example, the computer 700 can be an example of devices 1805, 1815, or a server (such as device 1810). The computer 700 includes processing circuitry, as discussed above. The device 1815 may include other components not explicitly illustrated in FIG. 7 such as a CPU, GPU, main memory, frame buffer, etc. The processing circuitry includes one or more of the elements discussed next with reference to FIG. 7. In FIG. 7, the computer 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the computer 700. In one implementation, the memory 720 is a computer-readable medium. In one implementation, the memory 720 is a volatile memory. In another implementation, the memory 720 is a non-volatile memory.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the computer 700. In one implementation, the input/output device 740 includes a keyboard and/or pointing device. In another implementation, the input/output device 740 includes a display for displaying graphical user interfaces.

Next, a hardware description of a device 2101 according to exemplary embodiments is described with reference to FIG. 8. In FIG. 8, the device 2101, which can be the above-described devices of FIG. 8, includes processing circuitry, as discussed above. The processing circuitry includes one or more of the elements discussed next with reference to FIG. 8. The device 2101 may include other components not explicitly illustrated in FIG. 8 such as a CPU, GPU, main memory, frame buffer, etc. In FIG. 8, the device 2101 includes a CPU 2100 which performs the processes described above/below. The process data and instructions may be stored in memory 2102. These processes and instructions may also be stored on a storage medium disk 2104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the claimed advancements may be provided as a utility application, background daemon, or component of an operating system, or combination thereof, executing in conjunction with CPU 2100 and an operating system such as Microsoft Windows, UNIX, Solaris, LINUX, Apple MAC-OS and other systems known to those skilled in the art.

The hardware elements in order to achieve the device may be realized by various circuitry elements, known to those skilled in the art. For example, CPU 2100 may be a Xenon or Core processor from Intel of America or an Opteron processor from AMD of America, or may be other processor types that would be recognized by one of ordinary skill in the art. Alternatively, the CPU 2100 may be implemented on an FPGA, ASIC, PLD or using discrete logic circuits, as one of ordinary skill in the art would recognize. Further, CPU 2100 may be implemented as multiple processors cooperatively working in parallel to perform the instructions of the processes described above.

The device 2101 in FIG. 8 also includes a network controller 2106, such as an Intel Ethernet PRO network interface card from Intel Corporation of America, for interfacing with the network 1850 (also shown in FIG. 6), and to communicate with the other devices of FIG. 6. As can be appreciated, the network 1850 can be a public network, such as the Internet, or a private network such as an LAN or WAN network, or any combination thereof and can also include PSTN or ISDN sub-networks. The network 1850 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device further includes a display controller 2108, such as a NVIDIA GeForce GTX or Quadro graphics adaptor from NVIDIA Corporation of America for interfacing with display 2110, such as an LCD monitor. A general purpose I/O interface 2112 interfaces with a keyboard and/or mouse 2114 as well as a touch screen panel 2116 on or separate from display 2110. General purpose I/O interface also connects to a variety of peripherals 2118 including printers and scanners.

A sound controller 2120 is also provided in the device to interface with speakers/microphone 2122 thereby providing sounds and/or music.

The general-purpose storage controller 2124 connects the storage medium disk 2104 with communication bus 2126, which may be an ISA, EISA, VESA, PCI, or similar, for interconnecting all of the components of the device. A description of the general features and functionality of the display 2110, keyboard and/or mouse 2114, as well as the display controller 2108, storage controller 2124, network controller 2106, sound controller 2120, and general purpose I/O interface 2112 is omitted herein for brevity as these features are known.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system modules and components in the embodiments described above should not be understood as requiring such separation in all embodiments, and it should be understood that the described program components and systems can generally be integrated together in a single component or packaged into multiple components.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Obviously, numerous modifications and variations are possible in light of the above teachings. It is therefore to be understood that within the scope of the appended claims, embodiments of the present disclosure may be practiced otherwise than as specifically described herein.

Embodiments of the present disclosure may also be as set forth in the following parentheticals:

(1) A magnetic positioning apparatus for an item of clothing, the apparatus including: an item of clothing having a front side and a back side; and at least one first magnet secured to the item of clothing, wherein the at least one first magnet is secured to the back side of the item of clothing.

(2) The apparatus of (1), further comprising: a sleeping surface having at least one second magnet, wherein the at least one first magnet is configured to magnetically engage the at least one second magnet.

(3) The apparatus of either (1) or (2), wherein the sleeping surface includes a hollow cavity provided within a depth of the sleeping surface; and the at least one second magnet at least is partially positioned within the hollow cavity.

(4) The apparatus of any one of (1) to (3), wherein an infant is free to move their arms and legs when the at least one first magnet is magnetically engaged with the at least one second magnet.

(5) The apparatus of any one of (1) to (4), further comprising: an alarm to detect a disengagement between the at least one first magnet and the at least one second magnet.

(6) The apparatus of any one of (1) to (5), wherein the sleeping surface includes a first edge and a second edge, and the hollow cavity is centered between the first edge and the second edge.

(7) The apparatus of any one of (1) to (6), wherein the sleeping surface includes a third edge and a fourth edge, and the hollow cavity is centered between the third edge and the fourth edge.

(8) The apparatus of any one of (1) to (7), wherein the at least one first magnet and the at least one second magnet are linear magnetic strips.

(9) The apparatus of any one of (1) to (8), wherein a top surface of the at least one second magnet is substantially planar with a top surface of the sleeping surface.

(10) The apparatus of any one of (1) to (9), wherein the at least one first magnet is removably secured to the infant garment.

(11) A method for positioning an infant on a sleeping surface, the method including: clothing the infant in a garment, the garment including at least one first magnet on a back of the garment; laying the infant down on a sleeping surface that includes at least one second magnet; and joining together via magnetic attraction, the at least one first magnet and the at least one second magnet.

(12) The method of (11), wherein the at least one first magnet is configured to align with an infant's spine.

(13) The method of either (11) or (12), wherein the at least one second magnet is positioned in a central region of the sleep surface.

(14) The method of any one of (1) to (13), further comprising: generating an alarm when the magnetic attraction between the at least one first magnet and the at least one second magnet is broken.

(15) A magnetic positioning apparatus, comprising: a garment having at least one first magnet; a sleeping surface that includes a hollow cavity; and at least one second magnet embedded in the hollow cavity.

(16) The apparatus of (15), further comprising: an alarm to detect when a magnetic attraction between the at least one first magnet and the at least one second magnet has been broken.

(17) The apparatus of either (15) or (16), wherein the sleeping surface includes a plurality of sensors.

(18) The apparatus of any one of (15) to (17), further comprising: an adjustable system coupled to the at least one second magnet and configured to adjust an arrangement of the at least one second magnet.

(19) The apparatus of any one of (15) to (18), further comprising: a motor coupled to the adjustable system; a plurality of sensors included in the sleeping surface, the plurality of sensors configured to detect an applied force; and processing circuitry configured to receive sensor data from the plurality of sensors describing a detected force and a sensor location, determine, based on the sensor data, an object footprint, determine, based on the object footprint, an arrangement for the at least one second magnet, and transmit the arrangement for the at least one second magnet.

(20) The apparatus of any one of (15) to (19), wherein the garment includes an identifying tag configured to describe a size of the garment and an arrangement of the at least one first magnet on the garment.

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A magnetic positioning apparatus for an item of clothing, the apparatus comprising:
- an item of clothing configured to be worn by an infant having a front side and a back side; and
- at least one first magnet secured to the item of clothing;
- a sleeping surface having at least one second magnet;
- an alarm to detect a disengagement between the at least one first magnet and the at least one second magnet;
- wherein the at least one first magnet is configured to magnetically engage the at least one second magnet, and
- wherein the at least one first magnet is secured to the back side of the item of clothing.

2. The apparatus of claim 1, wherein
- the sleeping surface includes a hollow cavity provided within a depth of the sleeping surface; and
- the at least one second magnet at least is partially positioned within the hollow cavity.

3. The apparatus of claim 2, wherein an infant is free to move their arms and legs when the at least one first magnet is magnetically engaged with the at least one second magnet.

4. The apparatus of claim 2, wherein
- the sleeping surface includes a first edge and a second edge, and
- the hollow cavity is centered between the first edge and the second edge.

5. The apparatus of claim 1, wherein
- the sleeping surface includes a third edge and a fourth edge, and
- the hollow cavity is centered between the third edge and the fourth edge.

6. The apparatus of claim 1, wherein the at least one first magnet and the at least one second magnet are linear magnetic strips.

7. The apparatus of claim 1, wherein a top surface of the at least one second magnet is substantially planar with a top surface of the sleeping surface.

8. The apparatus of claim 1, wherein the at least one first magnet is removably secured to the infant garment.

9. A method for positioning an infant on a sleeping surface, the method comprising:
- clothing the infant in a garment, the garment including at least one first magnet on a back of the garment;
- laying the infant down on a sleeping surface that includes at least one second magnet; and
- joining together via magnetic attraction, the at least one first magnet and the at least one second magnet; and
- generating an alarm when the magnetic attraction between the at least one first magnet and the at least one second magnet is broken.

10. The method of claim 9, wherein the at least one first magnet is configured to align with an infant's spine.

11. The method of claim 10, wherein the at least one second magnet is positioned in a central region of the sleep surface.

12. A magnetic positioning apparatus, comprising:
- a clothing garment configured to be worn by an infant, the clothing garment having at least one first magnet;
- a sleeping surface that includes a hollow cavity; and
- at least one second magnet embedded in the hollow cavity; and
- an alarm to detect when a magnetic attraction between the at least one first magnet and the at least one second magnet has been broken.

13. The apparatus of claim 12, wherein the sleeping surface includes a plurality of sensors.

14. The apparatus of claim 12, further comprising:
- an adjustable system coupled to the at least one second magnet and configured to adjust an arrangement of the at least one second magnet.

15. The apparatus of claim 14, further comprising:
- a motor coupled to the adjustable system;
- a plurality of sensors included in the sleeping surface, the plurality of sensors configured to detect an applied force; and
- processing circuitry configured to
  - receive sensor data from the plurality of sensors describing a detected force and a sensor location,
  - determine, based on the sensor data, an object footprint,
  - determine, based on the object footprint, an arrangement for the at least one second magnet, and
  - transmit the arrangement for the at least one second magnet.

16. The apparatus of claim 12, wherein the garment includes an identifying tag configured to describe a size of the garment and an arrangement of the at least one first magnet on the garment.

* * * * *